United States Patent

[11] 3,614,057

[72] Inventor Louis Hospe
2603 Senator Ave., Harbor City, Calif. 90710
[21] Appl. No. 868,545
[22] Filed Oct. 22, 1969
[45] Patented Oct. 19, 1971

[54] FLOW CONTROL VALVE
10 Claims, 4 Drawing Figs.
[52] U.S. Cl. .................................................. 251/251, 251/331, 251/335
[51] Int. Cl. .................................................. F16k 31/52
[50] Field of Search .................................................. 251/61.1, 251–263, 318, 328, 331, 333, 334

[56] References Cited
UNITED STATES PATENTS

| 997,124 | 7/1911 | Garcia | 251/331 X |
| 1,254,594 | 1/1918 | Hidden | 251/258 |
| 2,065,783 | 12/1936 | Woodbridge | 251/331 X |
| 2,408,006 | 8/1946 | Smith | 251/257 X |
| 2,682,977 | 7/1954 | Spiess, Jr. et al. | 251/331 X |
| 2,863,699 | 12/1958 | Elser | 251/331 X |
| 3,408,041 | 10/1968 | Kraft | 251/260 |

Primary Examiner—M. Cary Nelson
Assistant Examiner—David R. Matthews
Attorney—Lyon & Lyon ABSTRACT: A control valve for fluids having a body with a cylindrical bore in which is mounted an actuating plunger. The body has an inlet port in one end of the cylindrical bore and a lateral outlet port. The inlet port has a flexible seal sealing against a valve seat and a retainer seat and dislodging from said valve seat on sliding movement of said plunger within said bore to engage the center of said flexible seal and push it away from said seat. The plunger has portions relieved to permit fluid passage around the plunger to the outlet port. A head is provided with a shaft rotatably mounted therein and carrying a valve handle and an eccentric portion. The eccentric portion engages a slug mounted in line with said plunger to force said plunger to open position on turning of said handle to open position. The head and the valve body confine between them a flexible seal for said head.

PATENTED OCT 19 1971 3,614,057

INVENTOR.
LOUIS HOSPE
BY
Lyon & Lyon
ATTORNEYS

3,614,057

FLOW CONTROL VALVE

INTRODUCTION

This invention relates to a control valve for fluids and is characterized by the fact that a valve bore is provided having a cylindrical bore at the inlet end of which there is threadedly received a retainer which normally confines a flexible sealing member against a valve seat and in which an actuating plunger is disposed within a cylindrical bore and arranged to dislodge the flexible seal from the valve seat on movement of the actuating plunger into open position. The flexible seal is engaged adjacent its center by a reduced portion of the plunger which causes it to bend inward and move free of the valve seal. Fluid passages are provided around the edge of the seat and the sides of the plunger between the inlet and the outlet ports so that dislodging of the seal from the valve seat opens the valve. A valve head is provided on the other end of the valve bore and mounts a shaft having an eccentric member, which eccentric member engages a slug mounted in line with the actuating plunger. The eccentric portion of the shaft in the head engages the slug and forces the slug to push the actuating plunger into open position when the shaft is turned by an operating handle. The head and valve body confine a seal for said head between them. The flexible seal at the inlet port and the fluid pressure thereon provide the motive force for returning the parts to closed position when the handle is moved to the closed position.

It is a feature of this invention that the inlet port is controlled by a flexible seal which is opened by pressing against a central portion thereof to cause it to flex and raise itself away from a valve seat which action occurs without wear, friction, radial twist or other action causing the necessity of replacing the flexible seal.

It is another feature of this invention that the valve involves no packing gland, no hammering action, no washer, no lubrication, no close tolerances, and can be manufactured of metal or plastic without extensive machining.

It will be noted from the foregoing that all of the parts are of exceedingly rugged construction and accordingly very simple and economical to make and maintain.

It is accordingly one object of the present invention to provide a fluid control valve of the type described having the features above noted.

These and other objects, features and advantages will be apparent from the annexed specification in which.

Figure 1:
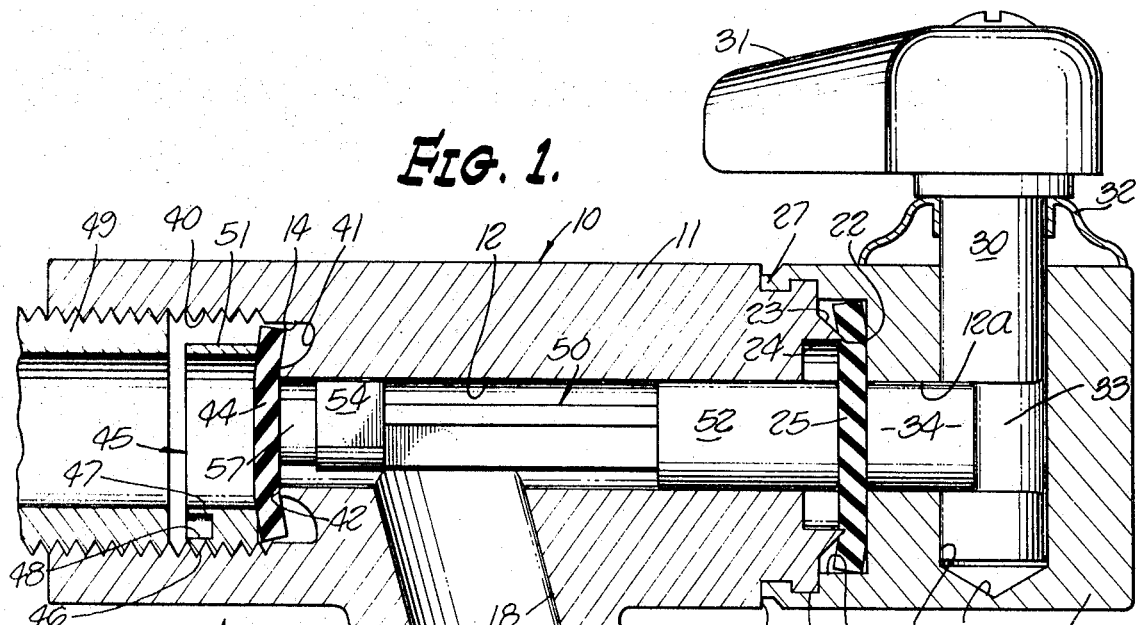
FIG. 1 is a section through a valve embodying the present invention.

Referring now more particularly to the drawings, the valve is indicated generally at 10 and includes a body 11 having a bore 12 disposed centrally thereof and extending longitudinally therethrough. The valve 10 also includes a head 13. The bore 12 is enlarged at one end 24 and a laterally extending bore 15 is formed in the head 13 which also has a bore 12a aligned with and communicating with the bore 12 of body 11. The bore 15 terminates short of one side of the head 13, as shown at 16. The bore 12a intersects the bore 15.

The body 11 also included a laterally extending portion 17 which is provided with a bore 18 which intersects the bore 12 as indicated. The free end of the member 17 may be threaded as at 19 to receive a pipe or hose fitting.

The end of the body 11 adjacent to the head 13 has an annular groove 20 formed in the exterior thereof. Adjacent the groove 20 the exterior dimension of the body is reduced as at 21 and the end of the body member 11 is provided with a portion wherein a tapered conical wall 23 intersects the straight wall 24 to form a sharp seat 22 for a flexible seal 25.

The head 13 has an enlarged bore 26 in which is seated the flexible seal 25 and the head 13 is retained on body 11 by spinning over a flange 27 in the annular groove 20 as shown.

Seated in bore 15 is a shaft 30 to which is attached operating handle 31. A dust guard 32 surrounds shaft 30 in the portion extending outwardly of the head 13. The shaft 30 has a portion machined to provide an eccentric 33. A short cylindrical slug 34 is seated in the bore 12a and engages one side of the flexible seal 25.

At its ends remote from the head 13 and the body 11 in the region of the enlarged bore 14 is provided with female threads as at 40. The body 11 adjacent the end of enlarged bore 14 has a portion 41 which is cut away or relieved to provide a valve seat 42 and a passage 43 into which the end of a flexible seal 44 may flex upon opening of the valve, as shown in FIG. 2.

Figure 3:
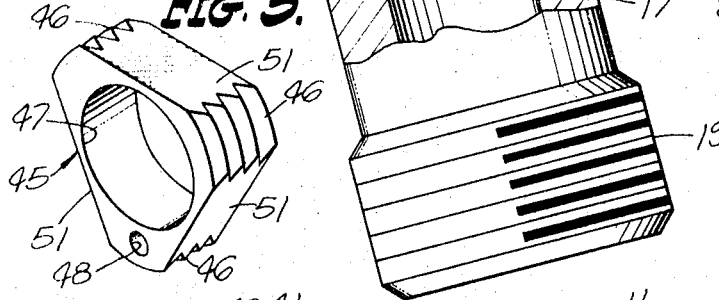
FIG. 3 is a perspective elevation of the retainer.
Figure 2:
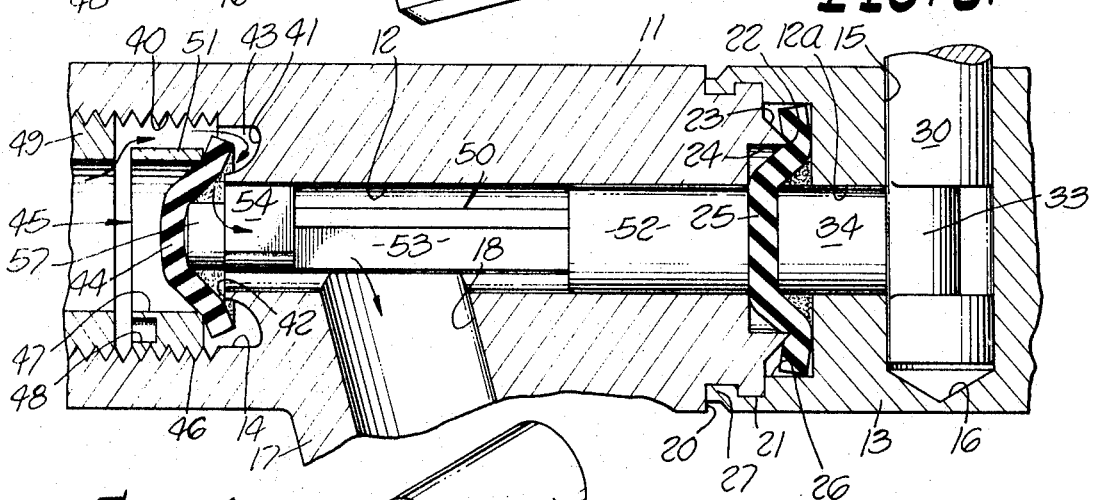
FIG. 2 is a view similar to FIG. 1 showing the valve in the open position.

A retainer 45, shown separately in FIG. 3, is provided and has three portions having the dimensions of circle segments and each of which has external threads 46 formed thereon for threading into female threads 40, as shown in FIGS. 1 and 2. The retainer 45 has a central bore 47. A pipe fitting 49 may thread into the female threads 40 after the retainer 45 has been driven home against the seal 44 by means of a suitable key fitted into bore 48. The retainer 45 has three flat sides 51 between the circular segments as shown to permit fluid to pass by the retainer 45 as indicated in FIG. 2.

Figure 4:
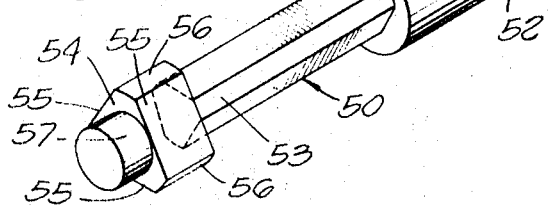
FIG. 4 is a perspective elevation of the actuating plunger.

Seated in bore 12 of body 11 is an actuating plunger 50 which is shown in detail in FIG. 4. This plunger 50 has a cylindrical section 52, a section 53 in which the cross-sectional area is reduced and bounded by straight edges which present six sides, each terminating well inside of the wall of bore 12 so as to permit unrestrained fluid passage. The plunger 50 also has a section 54 having three straight sides 55 and three sides 56 which have a radius of curvature substantially equal to that of the bore 12 so that the member 54 acts as a guide for its end of the plunger 50 while permitting fluid to pass by the straight sides 55. Finally, the plunger 50 at its end is provided with a short cylindrical section 57 of lesser diameter than the bore 12.

The inner end of bore 26 in head 13 abuts the flexible seal 25 and holds the seal against the seat 22.

In the foregoing description the plunger 50 has been described as having a cylindrical section 52, a section 53 having the configuration shown in FIG. 4, a section 54 with portions having a radius of curvature substantially equal to that of the bore 12 and a final section 57 of lesser diameter than the bore 12. The essential part is that there be passages around the edges of the plunger 50 to permit fluid entering the inlet port to bypass the plunger as in the region of the straight sides 55 and to pass to the lateral port 18. The tolerances are such that there are clearances in all parts and the plunger 50 is actually floating in the bore 12.

The operation of the above-described control valve is as follows. Assuming the parts to be in the condition shown in FIG. 1, the valve is closed. Seal 44 is seated against the valve seat 42 and retainer 45 and no fluid can enter the bore 12. Furthermore, seal 25 is seated on valve seat 22 and clamped against the end of enlarged bore 26 in head 13. A turning of handle 31 will rotate shaft 30 and cause eccentric 33 to force slug 34 against flexible seal 25 to cause it to take the position shown in FIG. 2. This action has forced actuating plunger 50 to the left (FIGS. 1 and 2) and caused portion 57 to engage the flexible seal 44 and force it into position shown in FIG. 2. In this position the seal 44 is free of seat 42 and fluid may enter the bore 12 and hence the bore 18 for flow out of laterally extending portion 18. However, no leakage takes place through head 13 as seal 25 is still engaging seat 22 and the end of bore 26.

Having described the invention and its mode of operation, what it is intended to claim is:

1. A control valve for fluids comprising: a valve body having a cylindrical bore forming a fluid passageway, an inlet port and an outlet port; an actuating plunger slidably mounted in said bore; a floating flexible seal engaged by one end of said actuating plunger; a valve seat on said body engaged by said flexible seal in one position of said actuating plunger and being free of said flexible seal in another position thereof; a retainer in said bore for confining said floating seal in seating alignment with said valve seat; said flexible seal engaging said valve seat in response to fluid pressure in said bore to close said inlet port; and means for sliding said actuating plunger within said bore to move and flex said flexible seal in opposition to the fluid pressure into open position whereby fluid flows around the edge of said seal to said outlet port.

2. A control valve as set forth in claim 1, in which said flexible seal comprises a flat disc.

3. A control valve as set forth in claim 1, in which said retainer has portions of lesser dimensions than the radius of said bore to permit fluid passage around said portions and includes a center opening of greater diameter than the end of said shaft to receive said seal when moved by said end of said shaft away from said valve seat.

4. A control valve as set forth in claim 1, in which an annular space is provided around said valve seat to receive the edge of said flexed seal and thereby permit fluid flow therearound.

5. The control valve of claim 1, wherein said retainer comprises a sleeve member having portions of lesser dimensions than the radius of said bore to permit fluid passage around said portion and a central bore to receive said seal when moved by said plunger, said end of said plunger engaging said sleeve bore which is in concentric alignment therewith.

6. The control valve of claim 5, wherein said bore includes an annular space around said valve seat and in concentric alignment with said sleeve bore to permit movement therein of said edge of said distorted disc seal.

7. A control valve for fluids, comprising: a valve body having a bore forming an inlet port, an outlet port and a fluid passageway therebetween; a valve seat in said bore between said inlet port and said outlet port; a floating disc seal having one side adapted to engage said valve seat in response to fluid pressure in said passageway acting on said other side and thereby close said fluid passageway; a retainer for confining said floating disc seal in said passageway and in seating alignment with said valve seat; an actuating plunger slidably mounted in said bore for distorting said seal and moving said seal in opposition to the fluid pressure away from said valve seat to open said fluid passageway, said retainer being spaced from said valve seat for permitting fluid to flow around the edge of said disc seal and between said one side of said seal and said valve seat during distortion of said seal; and means for sliding said actuating plunger within said bore to move and distort said disc seal whereby fluid flows around said seal to said outlet port.

8. The control valve of claim 7 wherein said means for sliding said actuating plunger and said actuating plunger are separated by a flexible seal to prevent passage of fluid therethrough, said means having an eccentric section of a shaft mounted transversely to the line of travel of said actuating plunger, said eccentric section adapted to engage one side of said seal when said shaft is turned, whereby a force is transmitted through said seal and to said actuating plunger causing sliding thereof.

9. The control valve of claim 8, wherein said other end of said actuating plunger and said plunger moving means are separated by a flexible seal, said flexible seal adapted to transmit force from said means to said plunger while preventing the flow of fluid therethrough.

10. A control valve for fluids comprising: a valve body having a bore forming an inlet port and an outlet port; a circular valve seat in said bore having an annular relieved section therearound; a first fluid passageway between said inlet port and said valve seat and a second fluid passageway between said valve seat and said outlet port; a floating flexible disc seal in said first passageway having one side adapted to engage said valve seat in response to fluid pressure in said first passageway acting on said other side and thereby prevent communication of fluid between said first and second passageways, said disc seal having a greater diameter than said circular valve seat; a retainer in said first passageway for confining said floating disc seal in seating alignment with said valve seat, said retainer having a center bore in concentric alignment with said valve seat; an actuating plunger slidably mounted in said second passageway and having one end for engaging said one side of said disc seal, said one end having a substantially smaller diameter than said retainer bore and in concentric alignment therewith; and means for moving said one end of said actuating plunger against said one side of said seal in opposition to the fluid pressure and against said retainer, said actuating plunger being adapted to force said seal partially into said retainer bore to cause distortion of said seal with said free edge being flexed into said annular relieved section whereby a space is provided between said seal and said valve seat to permit fluid flowing around the said free edge of said disc to pass therethrough into said second passageway.